No. 892,292. PATENTED JUNE 30, 1908.
C. F. McLAUGHLIN.
RECORDER FOR MEASURING LUMBER.
APPLICATION FILED APR. 16, 1907.
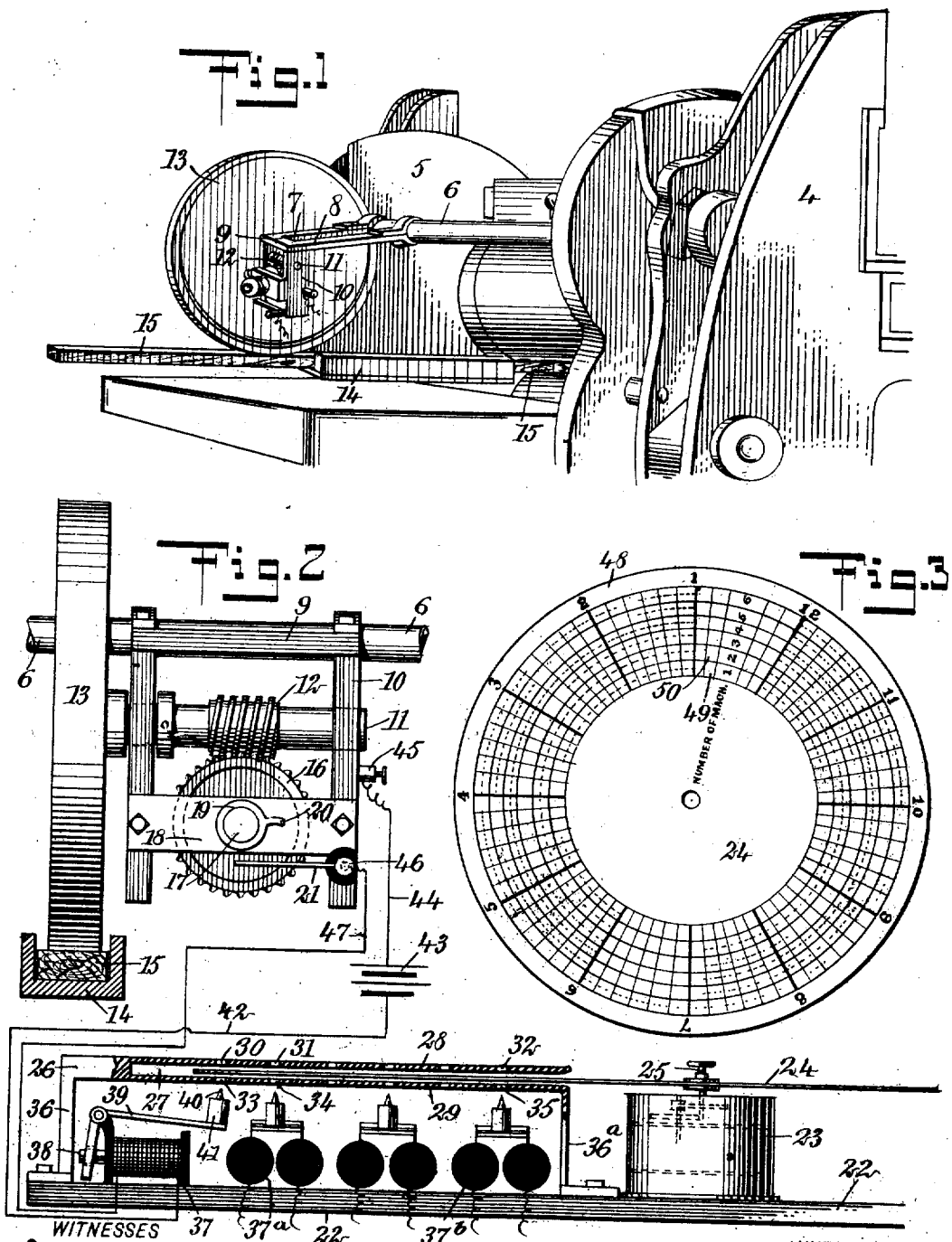
WITNESSES
INVENTOR
Clarence F. McLaughlin
BY Munn & Co
ATTORNEYS.

UNITED STATES PATENT OFFICE.

CLARENCE FLOYD McLAUGHLIN, OF NEAME, LOUISIANA.

RECORDER FOR MEASURING LUMBER.

No. 892,292.          Specification of Letters Patent.          Patented June 30, 1908.

Application filed April 16, 1907. Serial No. 368,509.

*To all whom it may concern:*

Be it known that I, CLARENCE F. McLAUGHLIN, a citizen of the United States, and a resident of Neame, in the parish of Vernon and State of Louisiana, have invented a new and Improved Recorder for Measuring Lumber, of which the following is a full, clear, and exact description.

My invention relates to recording mechanism, and more particularly to a device suitable for use as an attachment for planing mills and wood working machines of various kinds; the purpose being to record automatically the quantity of lumber operated upon by each machine, and to indicate losses of time occurring in the machines to which my attachment relates.

Reference is to be had to the accompanying drawings forming a part of this specification, in which similar characters of reference indicate corresponding parts in all the figures.

Figure 1 is a perspective showing my attachment as applied to the tail of a machine; Fig. 2 is a rear elevation of the attachment, and shows also a side elevation, partly diagrammatic, of the recording disk and electrically-operated means for marking the same; and Fig. 3 is a plan view of one of the recording disks removed from its mountings.

The framework of the tail of the machine is indicated at 4. A shaft 6 is supported by this framework, and is adapted to rock within certain limits. Two bars 7, 8 are connected integrally together by a piece 9, the three parts together constituting a U-shaped link, connected with the rocking shaft 6. This link carries a frame 10 in which is journaled a stub shaft 11, and mounted rigidly upon this stub shaft is a worm 12. A drag wheel 13 is secured firmly upon the stub shaft 11, and consequently is revoluble with the same and with the worm 12. A lumber chute 14 is disposed below the drag wheel 13, and through this lumber chute the stock 15 is adapted to travel as it is ejected from the machine. A worm gear 16 meshes with the worm 12, and is mounted rigidly upon a stub shaft 17 carried by a board 18 constituting a part of the frame 10. A metallic sleeve 19 is secured rigidly upon the shaft 17, and is provided with a contact finger 20 projecting radially outward from the shaft. A contact spring 21 is disposed partially within the path of rotation of the contact finger 20, and consequently this contact finger 21 is periodically engaged by the contact finger 20 as the shaft 17 turns.

Mounted upon a base 22 is a clock 23, which supports a revoluble record disk 24 by aid of a stem 25, so that the record disk turns once in twelve hours. A block 26 is provided with a slot 27, whereby it is divided into two plates 28, 29 connected integrally together. The plate 28 is provided with holes 30, 31, 32, and the plate 29 is similarly provided with holes 33, 34, 35 registering therewith. The plate 26 is supported by legs 36, 36$^a$ in such position that the slot 27 receives the revoluble record disk 24. For the sake of clearness, the slot 27 is, in this instance, shown as having considerable width, though in practice the record disk 24 merely fits neatly within the slot so as to travel freely.

A number of solenoids 37, 37$^a$, 37$^b$ are provided, there being one solenoid for each machine. Each of these solenoids is provided with a movable core 38 of magnetic material, and which is flexibly connected to a lever 39 carrying a stylus punch 40 and a weight 41 for retracting the lever. The solenoid 37 is connected by a wire 42 with a battery 43, or equivalent source of electricity, and from this battery a wire 44 runs to a binding post 45 upon the framework 10. Another binding post 46 is insulated from this framework, and supports the contact spring 21. From the binding post 46 a wire 47 leads back to the solenoid 37.

It will be understood that there are as many circuits of the kind just described as there are machines. The disk 24 is provided with a circle 48 containing designations of the work hours, say from one to twelve, and is further provided with accurate spaces 49 and 50 containing numerals or legends designating the respective machines.

The operation of my invention is as follows: The connections being made as described, the clock 23 is started up in the usual manner and the disk 24 begins its rotation which, as above explained, is completed during the work day. We will suppose that there are three machines in operation, and that they respectively control the solenoids 37, 37$^a$, 37$^b$. The connections being identical, only one set need be described. The stock 15 travels beneath the drag wheel 13 and causes the latter to turn, and this rotates the worm 12 and causes a slow revolution of the worm gear 16. I preferably proportion the parts so that one turn of the worm gear 16 represents a passage of 120 feet of lumber beneath the drag wheel 13. In this way the contact finger 20 engages the contact spring 21 every time 120 feet of lumber pass out of the machine affected. The circuit completed is as follows: battery 43, wire 44, binding post 45, frame 10, shaft 17, sleeve 19, contact finger 20, contact spring 21, wire 47, solenoid 37 (or 37ª, or 37b, as the case may be), wire 42, back to the battery 43. This energizes the solenoid and causes it to draw its core inward, and this tilts the lever 39, thereby causing the punch or stylus 40 ot indent the revoluble record 24. The latter being made of paper or other impressible material, the mark made upon it remains, and may be observed afterward (see Fig. 3).

As each of the punches can only mark a particular circle of the record, it follows that the work done by each of the machines occupies a particular circle, and that there can be no confusion as to the work done by the different machines. It is also obvious that the idleness, as well as the work done, is made apparent on the face of the record.

Each day the record sheet is removed and replaced by a new one. The old record sheets are kept on file for reference, and may be used in making out pay rolls, or in settling disputes at any time in determining the lineal feet run.

Having thus described my invention, I claim as new and desire to secure by Letters Patent:

The combination of a supporting frame, a chute, a drag wheel extending therein and provided with a surface to be engaged by stock passing through said chute, a revoluble shaft journaled within said frame and connected with said drag wheel so as to be turned by movements thereof, a worm mounted upon said shaft, a worm gear journaled upon said shaft, a worm gear journaled upon said frame and meshing with said worm, so as to have a comparatively slow movement, a shaft for supporting said worm gear, a sleeve encircling said shaft and provided with a contact member projecting radially therefrom, a contact spring disposed partially within the path of travel of said projecting portion, and a registering mechanism in electrical communication with said contact spring and with said sleeve.

In testimony whereof I have signed my name to this specification in the presence of two subscribing witnesses.

CLARENCE FLOYD McLAUGHLIN.

Witnesses:
L. G. KING,
C. BRUCE.